(12) United States Patent
Sinay et al.

(10) Patent No.: US 11,150,725 B2
(45) Date of Patent: *Oct. 19, 2021

(54) SYSTEM FOR DETECTING SIX DEGREES OF FREEDOM OF MOVEMENT BY TRACKING OPTICAL FLOW OF BACKSCATTERED LASER SPECKLE PATTERNS

(71) Applicant: Magic Leap, Inc., Plantation, FL (US)

(72) Inventors: Asif Sinay, Tel-Aviv (IL); Barak Freedman, Binyamina (IL)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,542

(22) Filed: Apr. 7, 2020

(65) Prior Publication Data
US 2020/0310534 A1    Oct. 1, 2020

Related U.S. Application Data

(63) Continuation of application No. 15/960,497, filed on Apr. 23, 2018, now Pat. No. 10,649,523.
(Continued)

(51) Int. Cl.
*G06F 3/01* (2006.01)
*G06T 7/246* (2017.01)
(Continued)

(52) U.S. Cl.
CPC ......... *G06F 3/012* (2013.01); *G02B 27/0172* (2013.01); *G06F 1/163* (2013.01);
(Continued)

(58) Field of Classification Search
CPC ............. G06F 3/011–015; G06F 3/017; G06F 3/0304–0325; G06T 7/20–292; G02B 27/01–0189; G02B 2027/0105–0198
See application file for complete search history.

(56) References Cited

U.S. PATENT DOCUMENTS 7,292,232 B2 * 11/2007 Ranta .................... G06F 3/0421
345/175
8,451,224 B2 * 5/2013 Doumuki .............. G06F 3/0304
345/158
(Continued)

FOREIGN PATENT DOCUMENTS

CN    103514450 A    1/2014
CN    106525003 A    3/2017
(Continued)

OTHER PUBLICATIONS

PCT/US2018/028964, "International Preliminary Report on Patentability", dated Nov. 7, 2019, 7 pages.
(Continued)

*Primary Examiner* — Patrick F Marinelli
(74) *Attorney, Agent, or Firm* — Kilpatrick Townsend & Stockton LLP

(57) ABSTRACT

Augmented reality headgear includes transparent displays that allow a user to simultaneously view the real world and virtual content positioned in the real world and further includes at least one source of coherent light and at least one sensor array for sensing, at a series of times, speckle patterns produced when the coherent light impinges environment surfaces. Circuitry is provided for sensing shifts in the speckle pattern and determining motion which caused the shift of the speckle pattern and adjusting the display of virtual objects displayed by the augmented reality headgear to compensate for the motion.

20 Claims, 10 Drawing Sheets

Related U.S. Application Data

(60) Provisional application No. 62/489,339, filed on Apr. 24, 2017.

(51) Int. Cl.
    *G02B 27/01* (2006.01)
    *G06T 3/20* (2006.01)
    *G06F 3/03* (2006.01)
    *G06F 1/16* (2006.01)

(52) U.S. Cl.
    CPC .......... *G06F 3/0317* (2013.01); *G06F 3/0325* (2013.01); *G06T 3/20* (2013.01); *G06T 7/248* (2017.01); *G02B 2027/0178* (2013.01); *G06T 2207/10152* (2013.01); *G06T 2207/30244* (2013.01)

(56) References Cited

U.S. PATENT DOCUMENTS

| | | | |
|---|---|---|---|
| 9,024,872 B2 * | 5/2015 | Takahama | H04N 13/344 345/156 |
| 10,152,798 B2 * | 12/2018 | Gupta | G06K 9/6267 |
| 10,649,523 B2 * | 5/2020 | Sinay | G06F 3/0325 |
| 2004/0061680 A1 * | 4/2004 | Taboada | G06F 3/038 345/157 |
| 2007/0216894 A1 * | 9/2007 | Garcia | G06F 3/017 356/4.01 |
| 2009/0096783 A1 * | 4/2009 | Shpunt | G01B 11/25 345/419 |
| 2010/0020011 A1 * | 1/2010 | Doumuki | G06F 3/0346 345/158 |
| 2012/0206333 A1 * | 8/2012 | Kim | H04N 21/44218 345/156 |
| 2013/0300637 A1 | 11/2013 | Smits et al. | |
| 2014/0055353 A1 * | 2/2014 | Takahama | G06F 3/011 345/156 |
| 2014/0316305 A1 * | 10/2014 | Venkatraman | A61B 5/681 600/595 |
| 2015/0043770 A1 | 2/2015 | Chen et al. | |
| 2015/0116204 A1 * | 4/2015 | Kim | G06F 3/017 345/156 |
| 2015/0317833 A1 | 11/2015 | Ebstyne et al. | |
| 2016/0035140 A1 | 2/2016 | Bickerstaff et al. | |
| 2016/0041625 A1 * | 2/2016 | Maizels | G02B 27/0093 345/419 |
| 2016/0116745 A1 | 4/2016 | Osterhout et al. | |
| 2016/0187654 A1 | 6/2016 | Border et al. | |
| 2016/0198961 A1 | 7/2016 | Homyk et al. | |
| 2017/0234679 A1 * | 8/2017 | Raz | G02B 27/30 359/558 |
| 2017/0351099 A1 * | 12/2017 | Ukai | G02F 1/1335 |
| 2018/0129282 A1 * | 5/2018 | Sinay | H04N 5/23245 |
| 2018/0129284 A1 * | 5/2018 | Davis | G06F 3/0304 |
| 2018/0242841 A1 * | 8/2018 | Hainzl | G02B 27/0093 |
| 2018/0293739 A1 * | 10/2018 | Gupta | G06K 9/4642 |
| 2018/0307308 A1 * | 10/2018 | Sinay | G06T 7/248 |

FOREIGN PATENT DOCUMENTS

| | | |
|---|---|---|
| CN | 106526537 A | 3/2017 |
| JP | 3287002 B2 | 5/2002 |
| JP | 2012078342 A | 4/2012 |
| KR | 20160148557 A | 12/2016 |
| WO | 2016046514 A1 | 3/2016 |

OTHER PUBLICATIONS

PCT/US2018/028964, "PCT Search Report", dated Aug. 24, 2018, 10 pages.

PCTUS2018028964, "Invitation to Pay Add'l Fees and Partial Search Rpt", dated Jun. 21, 2018, 2 pages.

CN201880026770.X, "Office Action" with English Translation, dated Feb. 2, 2021, 11 pages.

EP18791186.2, "Extended European Search Report", dated Nov. 11, 2020, 14 pages.

Horvath, et al., "Usage of A Speckle Correlation for Object Surface Topography", SPIE Digital Library, Feb. 1, 2006, 6 pages.

Jo, et al., "SpeDo: 6 DOF Ego-Motion Sensor Using Speckle Defocus Imaging", IEEE 2015 IEEE International Conference on Computer Vision, vol. Dec. 2015, pp. 4319-4327.

Ko, et al., "A Novel 6-degree of Freedom Man-Machine Interface using Mems Sensors and Computer Vsion", IEEE International Conference on Networking, Sensing and Control, 2015, pp. 344-349.

KR10-2019-7034286, "Office Action", No English Translation available, dated Apr. 22, 2021, 5 pages.

Zizka, et al., "Specklesense: Fast, Precise, Low-cost And Compact Motion Sensing Using Laser Speckle", Proceedings of The 24th Annual ACM Symposium on User Interface Software and Technology, Oct. 2011, pp. 489-498.

JP2019-557356, "Office Action", English Translation, dated Jun. 21, 2021, 6 pages.

KR10-2019-7034286, "Notice of Decision to Grant", English Translation, dated Jul. 13, 2021, 4 pages.

\* cited by examiner

FIG. 6    4DoF (X, Y, Z, Roll)
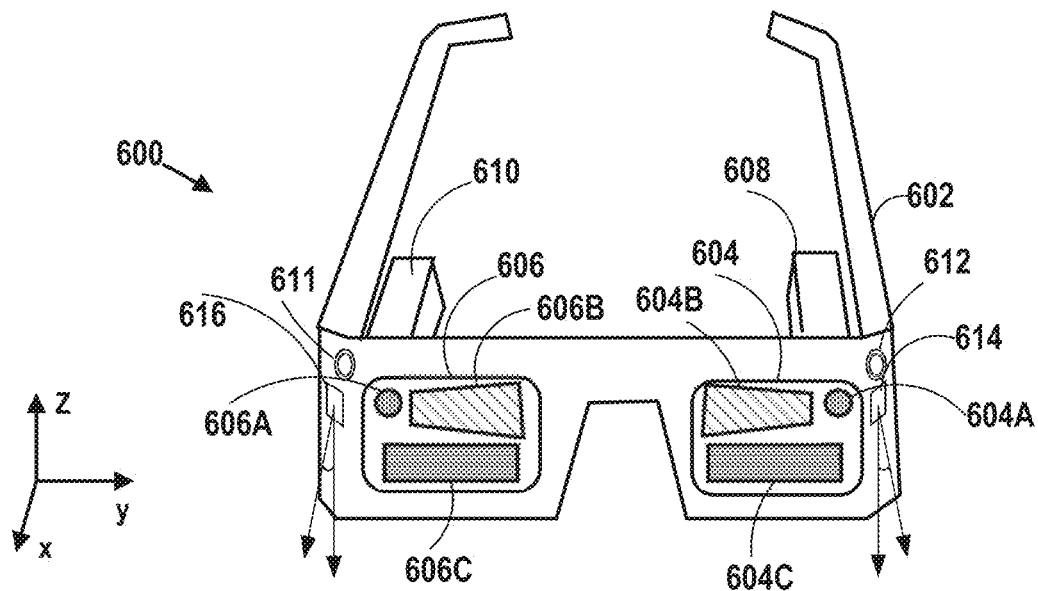
FIG. 7    4DoF (X, Y, Z, Roll)
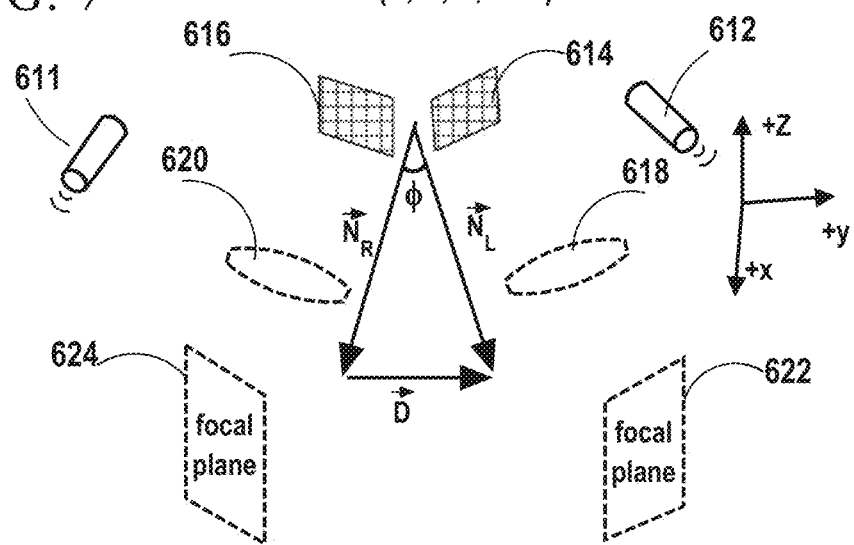

FIG. 10
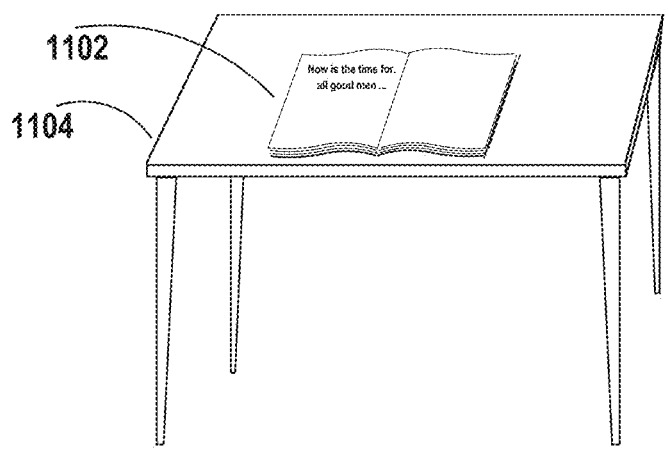
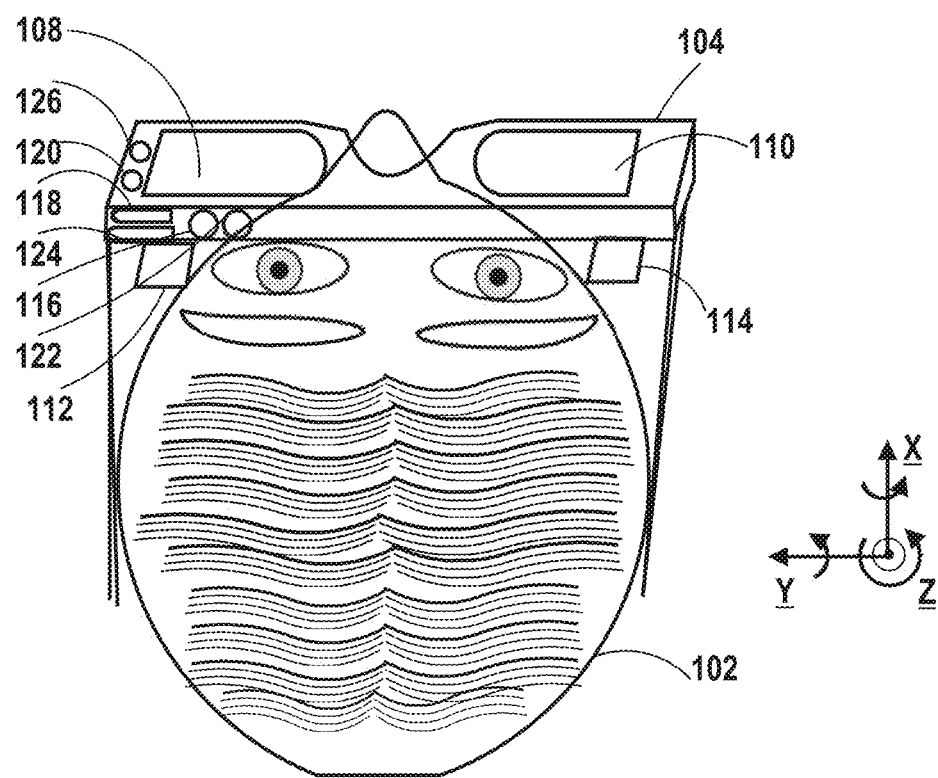

SYSTEM FOR DETECTING SIX DEGREES OF FREEDOM OF MOVEMENT BY TRACKING OPTICAL FLOW OF BACKSCATTERED LASER SPECKLE PATTERNS

CROSS-REFERENCE TO RELATED APPLICATIONS

This application is a continuation of U.S. patent application Ser. No. 15/960,497, filed on Apr. 23, 2018, entitled "SYSTEM FOR DETECTING SIX DEGREES OF FREEDOM OF MOVEMENT BY TRACKING OPTICAL FLOW OF BACKSCATTERED LASER SPECKLE PATTERNS," now U.S. Pat. No. 10,649,523, issued on May 12, 2020, which is a non-provisional of and claims the benefit of and priority to U.S. Provisional Patent Application No. 62/489,339, filed on Apr. 24, 2017, which are hereby incorporated by reference in their entireties for all purposes.

FIELD OF THE INVENTION

The invention pertains to augmented reality headgear.

BACKGROUND OF THE INVENTION

Recently virtual reality devices that immerse a user in a computer generated virtual world have been introduced. Certain virtual reality devices include a pair of displays placed in close proximity to a user's eyes and corrective optics interposed between the pair of displays and the user's eyes the purpose of which is to allow the user to focus on the imagery displayed on the displays notwithstanding the close proximity of the displays. The major application for such virtual reality devices is gaming although other applications such as scientific data visualization are also contemplated.

A technology being developed that is related to virtual reality but more sophisticated is augmented reality. Augmented reality wearables (i.e., headgear with an eye glasses form factor) will allow a user to simultaneously view the real world and virtual, computer generated content that is superimposed on the real world. To improve the illusion that virtual content is real and/or to more seamlessly integrate the virtual content and the real world it would be desirable that the virtual content appear to exist in the inertial reference frame fixed to the real environment of the user notwithstanding a user rotating their head with the headgear, or ambulating within their environment. So for example if the virtual content were to include a virtual book resting on a corner of a real world desk, the book should remain fixed in the real world, e.g., on the corner of the desk, even when the user rotates their head along with the augmented reality headgear that is projecting the image of the book on the corner of the desk. To accomplish this the movements of the headgear carried on the user's head will need to be carefully tracked and the image being generated by the augmented reality headgear rapidly shifted in the field of view to null out the effect of the movements of the headgear. One way to track the orientation of an object is to use one or more gyroscopes. However gyroscopes inherently suffer from drift and therefore attempting to fix virtual objects in the real world based on gyroscope output would lead to the virtual objects slowly drifting relative to the real world when they are intended to maintain fixed positions relative to the real world.

BRIEF SUMMARY OF THE INVENTION

According to certain embodiments disclosed herein augmented reality headgear is equipped with at least one laser and at least one optical sensor array. Each laser emits a beam that is partially reflected from a room surface (e.g., wall, ceiling or floor) creating a speckle pattern that is detected by the associated optical sensor array. The optical sensor arrays can for example be of the type that may be used in digital cameras, however in present application the 2D optical sensor arrays need not be used to capture a focused image of an object, rather they may be capturing a speckle patterned generated by a laser reflected from a room surface. The movement (in some cases appropriately termed the "optical flow") of the speckle pattern across the sensor array(s) is used to calculate the movement of the augmented reality headgear in an inertial reference frame fixed to the room. Images displayed using eyepieces of the augmented reality are shifted based on the calculated movement in order to maintain their position or velocity in the inertial reference frame fixed to the room.

One aspect of the disclosure is an augmented reality headgear including: at least one source of imagewise modulated light; at least one transparent eyepiece configured to couple the imagewise modulated light into a user's eye while allowing the user to see the real world; at least a first coherent light source aimed outward from the augmented reality headgear in a first direction so as to project coherent light on at least one environmental surface; at least a first sensor array configured to receive light diffracted by and reflected from the at least one environmental surface, the light forming a first speckle pattern on the first sensor array; electronic circuitry coupled to the source of imagewise modulated light and the first sensor array and configured to: operate the source of imagewise modulate light to display a virtual object at a set of coordinates defined in an inertial reference frame fixed to a physical space occupied by a user wearing the augmented reality headgear; receive a first copy of the first speckle pattern at a first time; receive a second copy of the first speckle pattern at a second time; determine a shift in the second copy of the first speckle pattern relative to the first copy of the first speckle pattern; determine a motion of the augmented reality headgear within the physical space occupied by the user based on the shift in the second copy of the first speckle pattern relative to the first copy of the first speckle pattern; and based on the motion of the augmented reality headgear, adjust the imagewise modulated light to compensate for the motion of the augmented reality headgear and maintain the virtual object at the set of coordinates defined in the inertial reference frame. Additionally a second sensor array configured to receive light reflected from the at least one environment surface may be provided. Additionally the augmented reality may also include a second coherent light source aimed outward from the augmented reality headgear in a second direction so as to project coherent light on the at least one environmental surface. Additionally the augmented reality headgear may also include a least one pupil stop configured to substantially exclude light from the second coherent light source that is reflected by the at least one environmental surface from reaching the first sensor array. Additionally, the augmented reality headgear may further include at least one optical component configured to establish mutually exclusive emission solid angle ranges of the first coherent light source and the second coherent light source. Additionally, the first sensor array may be mounted so as to have a first field of view and the second sensor array may be mounted so as to have a second field of view and the first field of view may partly overlap the second field of view.

One aspect of the disclosure is a method of sensing and distinguishing translation motions of a structure along a set of three independent axes and rotation of the structure about one of the set of three independent axes which includes: providing at least one source of coherent light that emits light over a predetermined solid angle range and is coupled to the structure; providing a first 2D optical sensor array that is coupled to the structure, the first 2D optical sensor array having a first normal vector pointing in a first direction; providing a second 2D optical sensor array that is coupled to the structure, the second 2D optical sensor array having a second normal vector pointing in a second direction wherein the first normal vector and the second normal vector define a plane and the first normal vector is angled with respect to the second normal vector in the plane; using the at least one source of coherent illumination to illuminate a non-specular environmental surface, whereby a first speckle pattern is produced at the first 2D optical sensor array and a second speckle pattern is produced at the 2D optical sensor array; sensing translation of the structure along a first of the set of three independent axes that includes a nonzero projection on the plane that is between the first normal vector and the second normal vector by sensing a first optical flow of the first speckle pattern on the first 2D optical sensor array and sensing a second optical flow of second speckle pattern on the second 2D optical sensor array wherein the first optical flow and the second optical flow have opposite direction projections on a difference vector between the first normal vector and the second normal vector; sensing translation of the structure along a second of the set of three independent axes that includes a nonzero projection on the plane that is outside an angular range between the first normal vector and the second normal vector by sensing a third optical flow of the first speckle pattern on the first 2D optical sensor array and sensing a fourth optical flow of the second speckle pattern on the second 2D optical sensor array wherein the third optical flow and the fourth optical flow have common direction projections on the difference vector between the first normal vector and the second normal vector; sensing translation of the structure along a third of the set of three independent axes that includes a nonzero component perpendicular to the plane by sensing same sense vertical direction optical flows of the first speckle pattern on the first 2D optical sensor array and the second speckle pattern on the second 2D optical sensor array; and sensing rotation of the structure about the first of the three independent axes by sensing opposite vertical direction optical flows of the first speckle pattern on the first 2D optical sensor array and the second speckle pattern on the second 2D optical sensor array.

One aspect of the disclosure includes a method of sensing and distinguishing translation motions of a structure along a set of three independent axes and rotation about the set of three independent axes, which includes: providing a first 2D optical sensor array coupled to the structure, the first 2D optical sensor array having a first surface normal pointed in a first direction and a first field of view; providing a second 2D optical sensor array coupled to the structure, the second 2D optical sensor array having a second surface normal pointed in a second direction and a second field of view; providing a third 2D optical sensor array coupled to the structure, the third 2D optical sensor array having a third surface normal pointed in a third direction and a third field of view; wherein the first direction, the second direction and the third direction are independent; providing at least one coherent light source that projects light into the first field of view, the second field of view and the third field of view, wherein light diffracted by and reflected from nonspecular surrounding surfaces forms a first speckle pattern on the first 2D optical sensor array, a second speckle pattern on the second 2D optical sensor array and a third speckle pattern on the third 2D optical sensor array; sensing rotation about the first direction by using the second 2D optical sensor array to sense translation of the second speckle pattern in a direction that is azimuthal with respect to the first direction and using the third 2D optical sensor array to sense translation of the third speckle pattern in a direction that is azimuthal with respect to the first direction; sensing translation in the first direction by using the second 2D optical sensor array to sense translation of the second speckle pattern in the first direction and using the third 2D optical sensor array to sense translation of the third speckle pattern in the third direction; sensing rotation about the second direction by using the first 2D optical sensor array to sense translation of the first speckle pattern in a direction that is azimuthal with respect to the second direction and using the third 2D optical sensor array to sense translation of the third speckle pattern in a direction that is azimuthal with respect to the second direction; sensing translation in the second direction by using the first 2D optical sensor array to sense translation of the first speckle pattern in the second direction and using the third 2D optical sensor array to sense translation of the third speckle pattern in the second direction; sensing rotation about the third direction by using the second 2D optical sensor array to sense translation of the second speckle pattern in a direction that is azimuthal with respect to the third direction and using the first 2D optical sensor array to sense translation of the first speckle pattern in a direction that is azimuthal with respect to the third direction; and sensing translation in the third direction by using the first 2d optical sensor array to sense translation of the first speckle pattern in the third direction and using the second 2d optical sensor array to sense translation of the second speckle pattern in the third direction.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 6 is a perspective view of augmented reality headgear with an eyeglasses form factor according to another embodiment;

FIG. 7 is a schematic diagram of a motion detection system included in the augmented reality headgear shown in FIG. 6;

FIG. 10 is a schematic illustration of an example of the use of augmented reality headgear according to an embodiment.

DETAILED DESCRIPTION OF THE INVENTION

Figure 1:
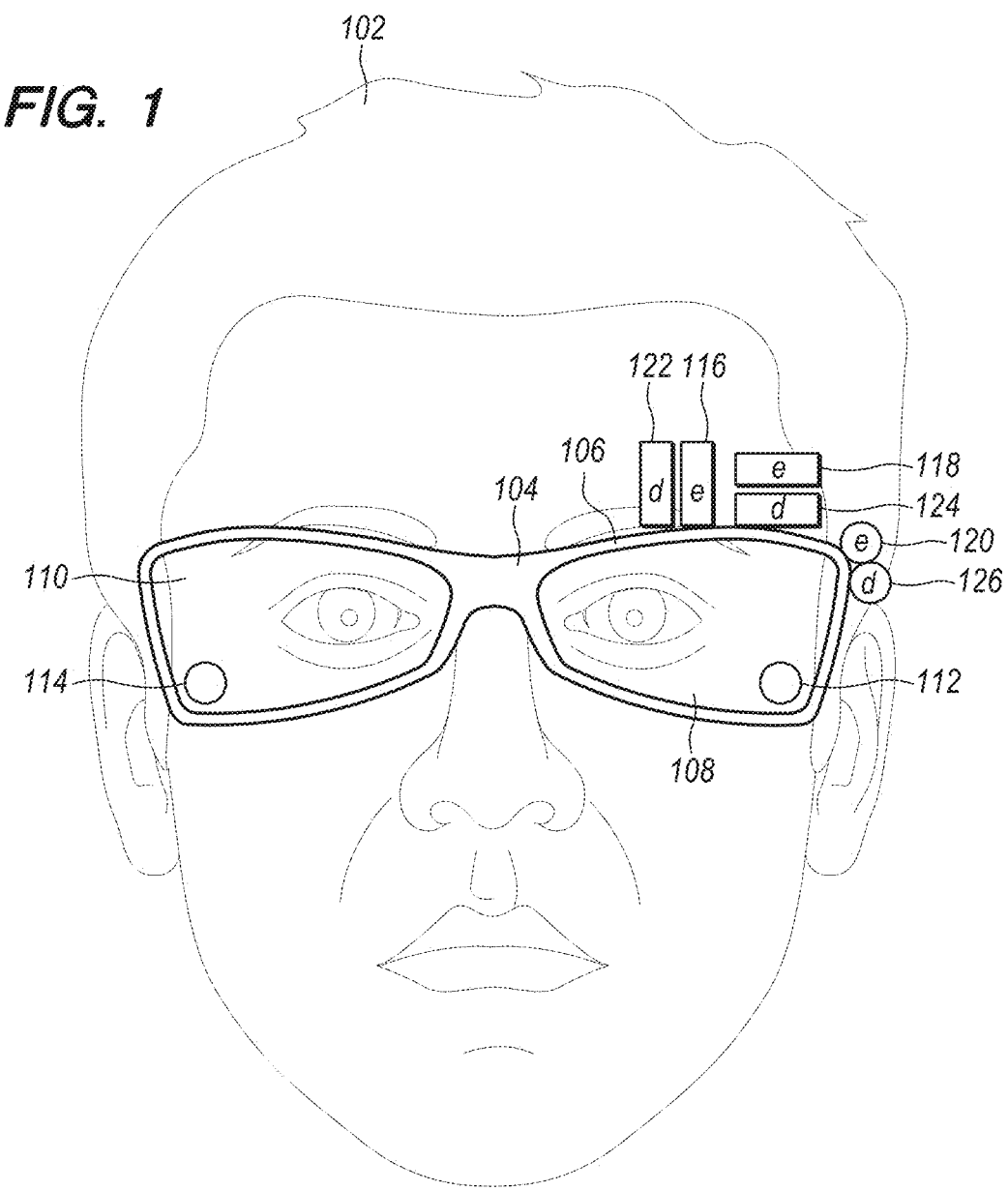
FIG. 1 is a front view of a user's head wearing augmented reality headgear according to an embodiment disclosed herein.

FIG. 1 is a front view of a user's head 102 wearing augmented reality headgear 104 according to an embodiment. The augmented reality headgear 104 has an eyeglasses form factor and includes a frame 106 in which are mounted a left (user's left) eyepiece 108 and a right eyepiece 110 which take the form of lenses (eyepieces) of the headgear 104. The eyepieces 108, 110 can include surface relief reflective and transmissive diffraction gratings that control the redirection of light toward the user's eyes or, can include tilted, partially reflective mirrors, embedded in the bulk eyepieces 108, 110. For example each eyepiece 108, 110 can include an incoupling grating (ICG) which receive imagewise modulated light and diffracts the imagewise modulated light to angles above the critical angle for total internal reflection (TIR) within each eyepiece. In addition to the ICG each eyepiece can further include an orthogonal pupil expansion grating (OPE) which incrementally deflects light directed by the ICG to the OPE down toward an exit pupil expander (EPE) which incrementally deflects light toward out toward a user eye position. Alternatively, the eyepieces 108, 110 can include a partially reflective front surface coating that redirects light to the user's eyes. In the latter case the eyepieces need not be planar but can include curved front and back (near eye) surfaces that have finite optical power. Referring again to FIG. 1, a left source of imagewise modulated light 112 is optically coupled to the left eyepiece 108 and a right source of imagewise modulated light 114 is optically coupled to the right eyepiece 110. The sources of imagewise modulated light 112, 114 can for example include Liquid Crystal on Silicon (LCoS) image projectors, fiber scanners, or emissive (e.g., micro Light Emitting Diode micro Organic Light Emitting Diode) display panels. The eyepieces 108, 110 serve to optically couple imagewise modulated light to the user's eye. The eyepieces 108, 110 are also transparent thereby allowing the user to view the real world. The sources of imagewise modulated light 112, 114 and the eyepieces 108, 110 are used to display images which in the present context are termed "virtual content". The virtual content augments the real world which is visible through the eyepieces 108, 110. The left eyepiece 108 in combination with the left source of imagewise modulated light 112 together form a left display and the right eyepiece 110 in combination with the right source of imagewise modulated light 114 forms a right display.

For many applications it is desirable have the virtual content positioned or moving (e.g. a virtual person walking) in an inertial reference frame fixed to the environment (e.g., room) within which the user of the augmented reality headgear is located, notwithstanding the fact that the augmented reality headgear 104 is being moved and rotated with the user as the user ambulates about the environment and turns his or her head 102 to look in different directions. To achieve the latter objective the imagery displayed via the eyepieces 108, 110 and the sources of imagewise modulated light 112, 114 must be shifted to compensate for the user's motions. Determining the correct shift requires carefully tracking the user's motions (translations and rotations). To this end, the augmented reality headgear 104 is equipped with upward pointing laser (source of coherent illumination) 116, a sideways pointing laser 118 and front pointing laser 120 all of which are mechanically coupled to the frame 106. The pointing directions of the lasers 116, 118, 120 can also be altered relative to the foregoing directions which are merely simple examples of suitable directions. An upward facing 2D optical sensor array 122, a sideways facing 2D optical sensor array 124 and a front facing 2D optical sensor array 126 are also provided and are mechanically coupled to the frame 106. The 2D optical sensor arrays 122, 124, 126 can for example comprise Complementary Metal Oxide Semiconductor (CMOS) pixel arrays or Charge Couple Device (CCD) pixel arrays. Light emitted by the upward pointing laser 116 is angularly within a field of view of the upward facing 2D optical sensor array 122, light emitted by the sideways pointing laser 118 is angularly within a field of view of the sideways facing 2D optical sensor array 124 and light emitted by the front pointing laser 120 is angularly within a field of view of the front facing 2D optical sensor array 126. Although light from each laser 116, 118, 120 is angularly within the field of view of a particular one of the 2D optical sensor arrays 122, 124, 126 to the extent that the light is propagating away from the emitting laser and associated 2D optical sensor array 122, 124, 126, it will not, to any significant degree, be detected by the associated 2D optical sensor array 122, 124, 126 unless scattered back by a surface, e.g., a wall, a ceiling, or furniture on which it impinges. With the exception of windows and mirrors such surfaces are generally diffuse so that the back scattered light will assume the form of a speckle pattern that fills the space between the scattering surface and 2D optical sensor arrays 122, 124, 126. The speckle pattern, in this case, is the diffraction pattern of the small scale roughness of the surface. The speckle patterns are detected by the 2D optical sensor arrays 122, 124, 126. Moreover as the user moves his head 102 with the augmented reality headgear 104 the 2D optical sensor arrays 122, 124, 126 will move through the space filling speckle pattern and such movement is detectable by reading out the 2D optical sensor arrays 122, 124, 126 at successive times. Because the lasers 116, 118, 120 move along with the 2D optical sensor arrays 122, 124, 126, the detected movement of the speckle pattern across the 2D optical sensor arrays will be twice the physical movement of the 2D optical sensor arrays 122, 124, 126. In the case of rigid body mechanics there are three translation degrees of freedom (e.g., translation along Cartesian X, Y, Z axes) and three rotation degrees of freedom e.g., yaw, pitch an roll. For convenience we can alternatively refer to rotations about the X, Y, and Z axes using the variables Rx, Ry, Rz.

Figure 2:
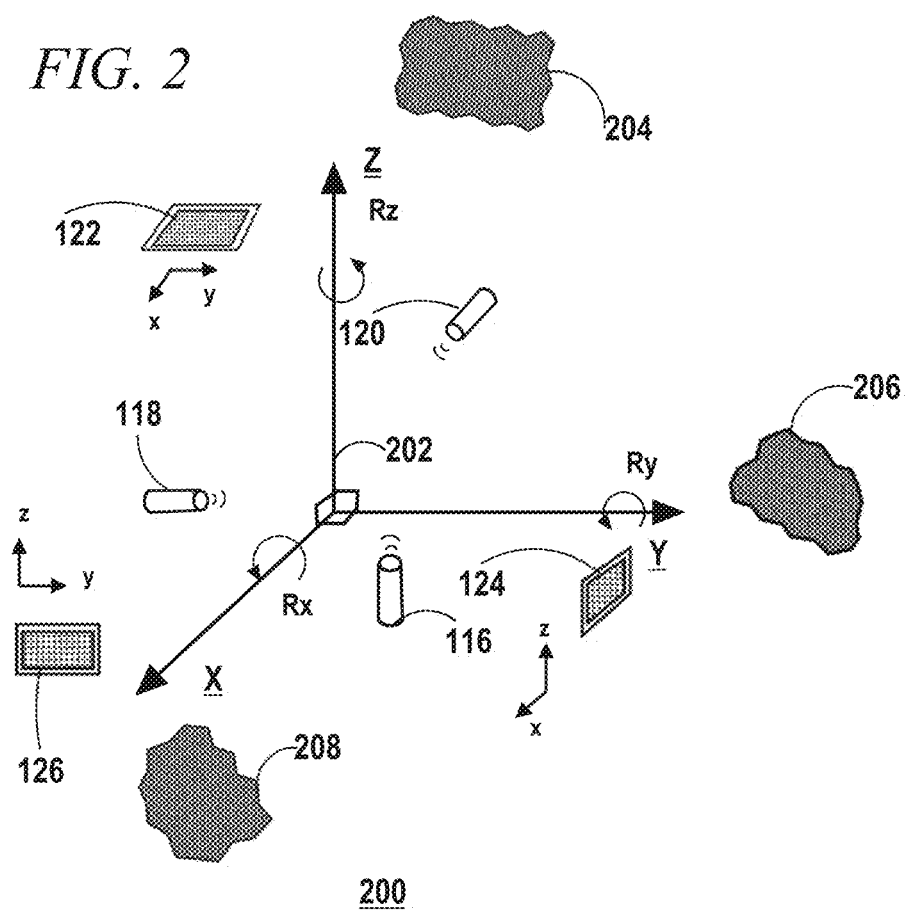
FIG. 2. is a schematic diagram of a motion detection system included in the augmented reality headgear shown in FIG. 1.

FIG. 2 is a schematic diagram of a motion detection system 200 included in the augmented reality headgear shown in FIG. 1. The motion detection system 200 includes the upward pointing laser 116, the sideways pointing laser 118, the front pointing laser 120, the upward facing 2D optical sensor array 122, the sideways facing 2D optical sensor array 124 and the front facing 2D optical sensor array 126. The aforementioned components are shown oriented relative to a 3D Cartesian coordinate system 202 including Z (upward), Y (sideways, user's left) and X (front) axes. Coherent light from upward (+Z) facing laser 116 is incident on a ceiling surface 204 which is non-specular and includes some small scale surface roughness which diffracts the coherent light forming a speckle pattern which impinges on the upward (+Z) facing 2D optical sensor array 122. Similarly coherent light from the sideways (+Y) facing laser 118 is incident on a sideways facing patch of wall 206 which scatters light forming a speckle pattern on the sideways (+Y) facing 2D optical sensor array 124. Likewise coherent light from the front (+X) facing laser 120 is incident on the rearward facing patch of wall 208 which scatters light forming a speckle pattern on the front (+X) facing 2D optical sensor array 126. In FIG. 2 rotations about the X, Y and Z axes are indicated by the notation Rx, Ry, Rz. A component of translation motion of the augmented reality headgear 104 along a particular Cartesian axes (X, Y, or Z) causes a speck shift parallel to the component on the two 2D optical sensor arrays 122, 124 and/or 126 facing in directions different from the component of translation motion. Thus, for example a translation component in the +X direction causes a +X direction translations of the speck patterns on the upward (+Z) facing 2D optical sensor array 122 and on the sideways (+Y) facing 2D optical sensor array 124. The induced translations of the speckle patterns are equal to twice the physical translations of the headgear 104. Each 2D optical sensor array 122, 124, 126 is operated at a frame rate that is sufficiently high so that a laser spot that is being sensed by the 2D sensor array 122, 124, 126 moves a distance that is a fraction of the size, (i.e., the Full Width Half Max, FWHM) of the spot between successive frames.

As shown in the schematic representation in FIG. 2 the 2D optical sensor arrays 122, 124, 126 are displaced from the Cartesian coordinate system origin. In the augmented reality headgear 104, the 2D optical sensor arrays are displaced from the effective center of rotation for head movements which is located in the vicinity of the back of the user's neck. Rotations about the X, Y and Z axes are sensed by sensing shifts of the speckle patterns produced on the 2D optical sensor arrays 122, 124, 126. A component of rotation about a given axes (X, Y or Z) will induce a speckle shift that is azimuthal with respect to the given axes on the 2D optical sensor arrays 122, 124 or 126 other than the 2D optical sensor array 122, 124 or 126 facing in a direction parallel to the given axis. (For the present purposes the positive sense of rotation about the positive Cartesian axes is defined using the right hand rule.) Thus for example the -X direction is azimuthal with respect to the Z-axis on the sideways (+Y) facing 2D optical sensor array 124 and the +Y direction is also azimuthal with respect to the Z-axis on the front (+X) facing 2D optical sensor array 126. Accordingly a positive Rz rotation component about the Z-axis will induce a X direction speckle shift on the sideways (+Y) facing 2D optical sensor array 124 and will induce a -Y direction speck shift on the front (+X) facing 2D optical sensor array 126.

Matrix equation EQU. 1 below relates incremental translations along Cartesian X, Y and Z axes and incremental rotations about the Cartesian X, Y and Z axes to shifts of the speckle patterns on the 2D optical sensor arrays 122, 124, 126.

$$\begin{bmatrix} 0 & C_{y,x,y} & 0 & 0 & 0 & C_{Rz,x,y} \\ 0 & 0 & C_{z,x,z} & 0 & -C_{Ry,x,z} & 0 \\ C_{x,y,x} & 0 & 0 & 0 & 0 & -C_{z,y,x} \\ 0 & 0 & C_{z,y,x} & C_{Rx,y,z} & 0 & 0 \\ C_{x,z,x} & 0 & 0 & 0 & C_{Ry,z,x} & 0 \\ 0 & C_{y,z,y} & 0 & -C_{Rx,z,y} & 0 & 0 \end{bmatrix} \quad \text{EQU. 1}$$

$$\begin{bmatrix} \Delta x \\ \Delta y \\ \Delta z \\ \Delta Rx \\ \Delta Ry \\ \Delta Rz \end{bmatrix} = \begin{bmatrix} S_x^y \\ S_x^z \\ S_y^x \\ S_y^z \\ S_z^x \\ S_z^y \end{bmatrix}$$

The nonzero coefficients in the coefficient matrix on the left hand side of EQU. 1 have three subscripts. The first subscript identifies one of six degrees of freedom on motion of the augmented reality headgear 104 among X, Y, Z translations and Rx, Ry, Rz rotations about the X, Y and Z axes. The second subscript identifies one of the 2D optical sensor arrays 122, 124, 126 by the direction (X, Y, or Z) in which it faces which is equal to the direction of the normal vector to the front (light receiving) surface of the 2D optical sensor array 122, 124, 126. The third subscript identifies a direction (X, Y, or Z) of speckle shift on the particular 2D optical sensor array 122, 124, 126 identified by the second subscript. The non-zero coefficients in the first three columns of the coefficient matrix which relate to translation degrees of freedom have values of 2. The non-zero coefficients in the third through sixth columns of the translation matrix have values of $2/R_{sensor}$, where $R_{sensor}$ is the distance between the 2D optical sensor array 122, 124 or 126 identified by the second subscript and the effective center of rotation (e.g., back of user's neck) when the user is wearing the augmented reality headgear 104.

The column vector on the left side of EQU. 1 includes incremental translations $\Delta x$, $\Delta y$, $\Delta z$ as the first three elements and incremental rotations $\Delta Rx$, $\Delta Ry$, $\Delta Rz$ about the X, Y and Z axes as the last three elements. Each element of column vector on the right hand side of EQU. 1 is a speckle shift on one of the 2D optical sensor arrays 122, 124, 126. Each speckle shift element is denoted by a subscripted and superscripted letter S. The subscript identifies one of the 2D optical sensor arrays 122, 124, 126 by the direction in which its normal vector is oriented (the direction it faces). The superscript identifies a direction of speckle shift on the 2D optical sensor array 122, 124, 126. By way of illustration the first row of the coefficient matrix C indicates that both a translation in the y direction (as indicated by $C_{y,x,y}$) and a rotation about the Z axis (as indicated by $C_{Rz,x,y}$) will cause a y direction (azimuthal with respect to z axis) speckle shift on the front (+X) direction facing 2D optical sensor array 126). The coefficient matrix is readily invertible leading to matrix equation EQU. 2 given below:

$$[C^{-1}] \cdot \begin{bmatrix} S_x^y \\ S_x^z \\ S_y^x \\ S_y^z \\ S_z^x \\ S_z^y \end{bmatrix} = \begin{bmatrix} \Delta x \\ \Delta y \\ \Delta z \\ \Delta Rx \\ \Delta Ry \\ \Delta Rz \end{bmatrix} \quad \text{EQU. 2}$$

where $C^{-1}$ is the inverse of the matrix in EQU. 1. EQU. 2 is used to determine incremental translations and rotations of the augmented reality headgear 104 based on the vector of speckle shifts appearing in the left hand side of EQU. 2. The incremental speckle shifts can be obtained by reading the speckle patterns formed on the 2D optical sensor arrays 122, 124, 126 at two successive times and determining the relative shift of the speckle patterns at the two successive times. Optical flow tracking methods such as the Farneback method or normalized cross correlation may be used to determine the relative shift of the speckle patterns. Based on the determined incremental translations and rotations, the virtual content being output via the sources of imagewise modulated light 112, 114 and the eyepieces 108, 110 is adjusted to maintain position and/or motion in an inertial coordinate system fixed to the environment within which the augmented reality headgear 104 is being used. The 2D optical sensor arrays 122, 124, 126 are read at a sufficiently high rate compared to the maximum anticipated rate of the augmented reality headgear, so that frame-to-frame change in the pointing angle of the lasers 116, 118, 120 is fraction of the FWHM beam divergence of the lasers 116, 118, 120 (including the effect of the diffusers 310, 312 FIG. 3). Accordingly, frame-to-frame change in speckle patterns sensed by the 2D optical sensor arrays 122, 124, 126 is primarily a shift (optical flow). Additionally, the lasers 116, 118, 120 can be operated in pulse mode, at a pulse rate equal to a frame rate of the 2D optical sensor arrays 122, 124, 126 and a pulse width that is substantially shorter than the frame period (1/frame rate) of the 2D optical sensor arrays 122, 124, 126. Using such a short laser pulse width will help to avoid motion induced blur of the speckle pattern.

Figure 3:
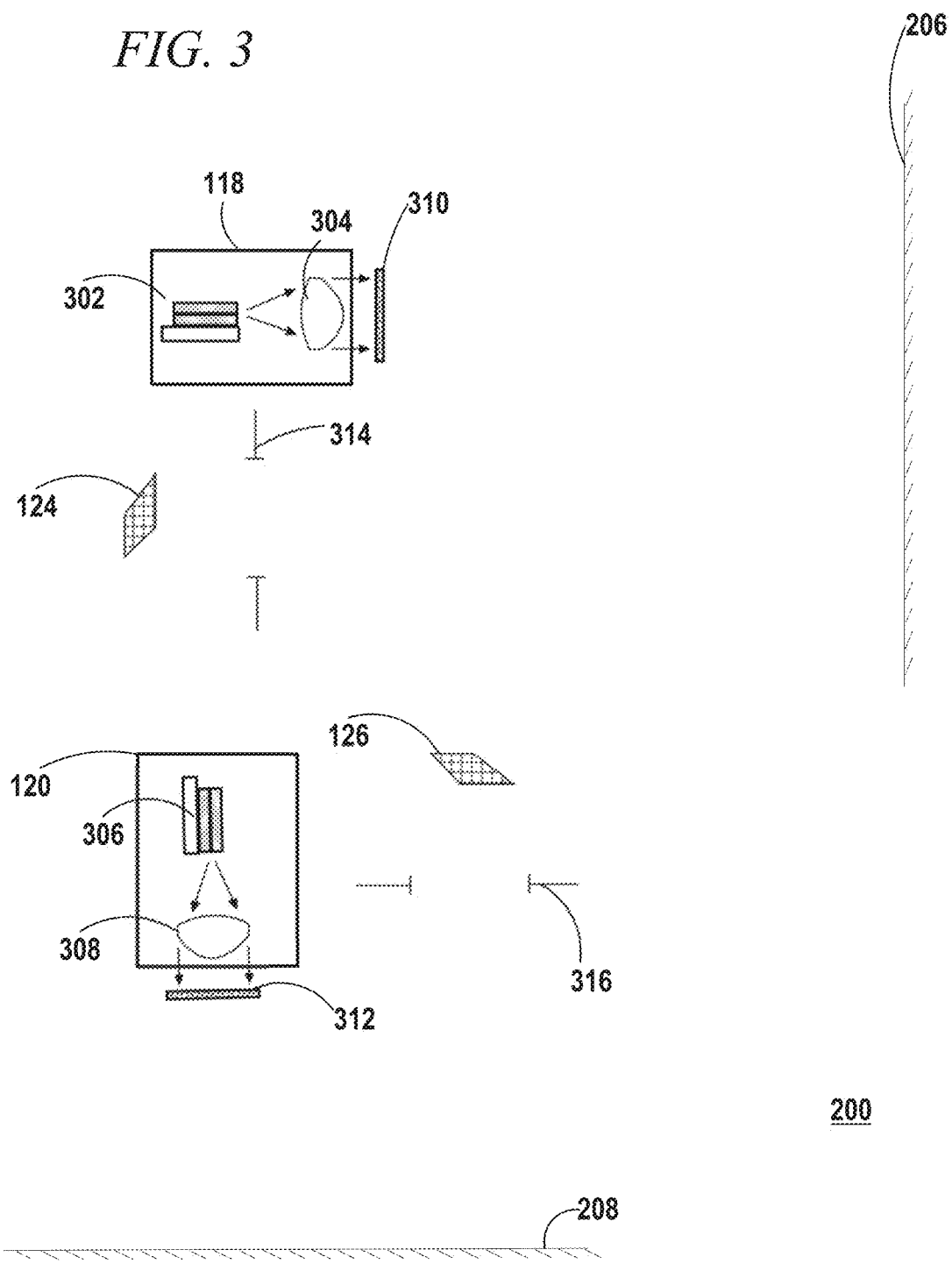
FIG. 3 is a schematic diagram of a portion of the motion detection system shown in FIG. 2 illustrating optical isolation between two sources of coherent light according to an embodiment.

FIG. 3 is a schematic diagram of a portion of the motion detection system shown in FIG. 2 illustrating optical isolation between two sources of coherent light according to an embodiment. The view shown in FIG. 3 includes the sideways pointing laser 118 and the front pointing laser 120. As shown the sideways pointing laser 118 includes a first laser diode 302 optically coupled to a first collimating lens 304 and similarly the front pointing laser 120 includes a second laser diode 306 optically coupled to a second collimating lens 308. The collimating lenses 304, 308 establish mutually exclusive solid angle ranges of coverage (emission) of the sideways pointing laser 118, and the front pointing laser 120. The first collimating lens 304 forms a sideways propagating light beam and the second collimating lens 308 forms a frontward propagating light beam. Alternatively, in lieu of collimating lenses, lenses that form controlled divergence beams may be used. Furthermore beam shaping lenses that establish a certain radial (e.g., flattop) or nonaxisymmetric beam profile may be user in lieu of the collimating lenses. A first low angle diffuser 310 is positioned in front of the first collimating lens 304 and a second low angle diffuser 312 is positioned in front of the second collimating lens 308. The low angle diffusers 310, 312 reduce the luminance of light beams formed by the collimating lenses 304, 308 and are useful for eye safety. Note that the laser diodes 302, 306 may be infrared emitting in which case the user would not be able to see the emitted light. The low angle diffusers 310, 312 can, by way of non-limiting example, be characterized by a diffusion FWHM of 2° to 20°. The sideways facing 2D optical sensor array 124 and the front facing 2D optical sensor array 126 are also shown in FIG. 3. A sideways facing pupil stop 314 is positioned in front of the sideways facing 2D optical sensor array 124 and serves to limit the field of view of the sideways facing 2D optical sensor array 124. Similarly a front facing pupil stop 316 is positioned in front of the front facing 2D optical sensor array 126 and serves to limit the field of view of the front facing 2D optical sensor array 126. The sideways facing pupil stop 314 establishes a field of view of the sideways facing 2D optical sensor array 124 that substantially overlaps a solid angle range of emission of the sideways pointing laser 118 as expanded by the first low angle diffuser 310 and substantially excludes a solid angle range emission of the front pointing laser 120 as expanded by the second low angle diffuser 312. Similarly the front facing pupil stop 316 establishes a field of view of the front facing 2D optical sensor array 126 that substantially overlaps a solid angle range of emission of the front pointing laser 120 as expanded by the second low angle diffuser 312 and substantially excludes a solid angle range of emission of the sideways pointing laser 118 as expanded by the first low angle diffuser 310. Thus each 2D optical sensor array will receive only a single speckle pattern produced by light emitted by its associated laser. Another purpose of the pupil stops 314, 316 is enlarge the size of the speckles in the speckle pattern that is incident on each 2D optical sensor array 124, 126. The characteristic size of the speckles in the speck pattern should be equal to or larger than the size of individual sensor elements (pixels) that make up the 2D sensor arrays 124, 126. Although not shown in FIG. 3 the upward pointing laser 116 can have the same internal design as that shown in FIG. 3 for the sideways pointing laser 118 and the front pointing laser 120 and also be equipped with a low angle diffuser, and the upward facing 2D optical sensor array 122 can also be equipped with a pupil stop.

According to an alternative embodiment the sensor arrays 122, 124, 126 are spectrally isolated from emissions of the lasers 116, 118, 120 other than the one with which they are associated. In one implementation the upward pointing laser 116 emits a first spectral line having a first peak wavelength, the sideways pointing laser 118 emits a second spectral line having a second peak wavelength and the front pointing laser 120 emit a third spectral line having a third peak wavelength. A first spectrally selective filter that transmits the first spectral line but not the second spectral line or the third spectral line is positioned over the upward facing 2D optical sensor array 122; a second spectrally selective filter that transmits the second spectral line but not the first spectral line or the third spectral line is positioned over the sideways facing 2D optical sensor array 124; and a third spectrally selective filter that transmits the third spectral line but not the first spectral line or the second spectral line is positioned over the front facing 2D optical sensor array 126.

Figure 4A:
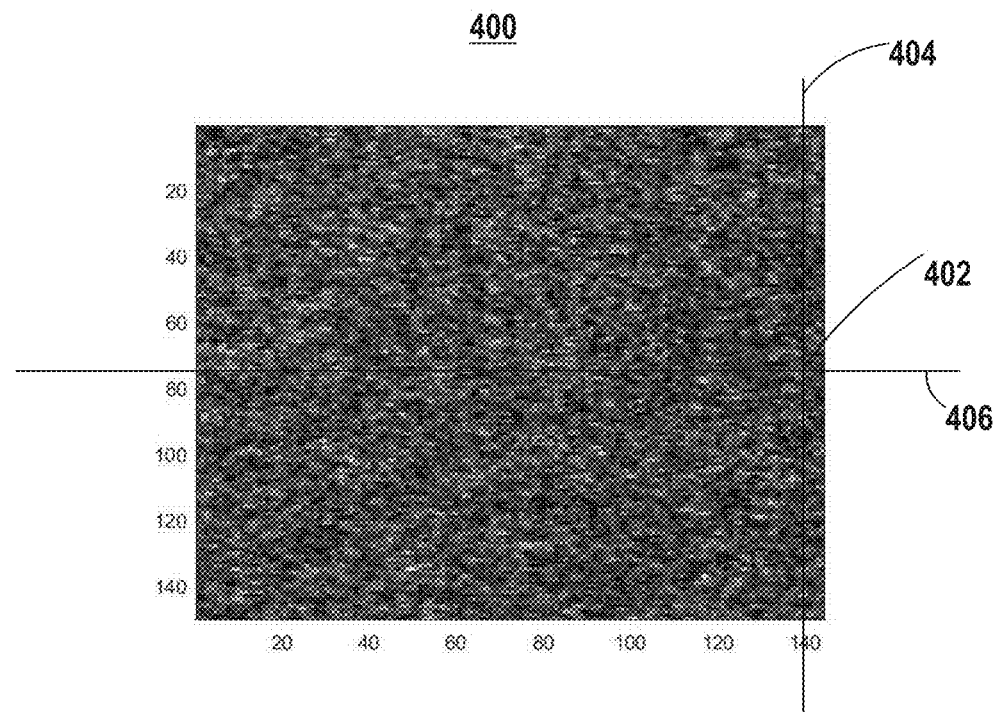
FIGS. 4a-4f show a sequence of speckle patterns corresponding to a sequence of translation steps.
Figure 4B:
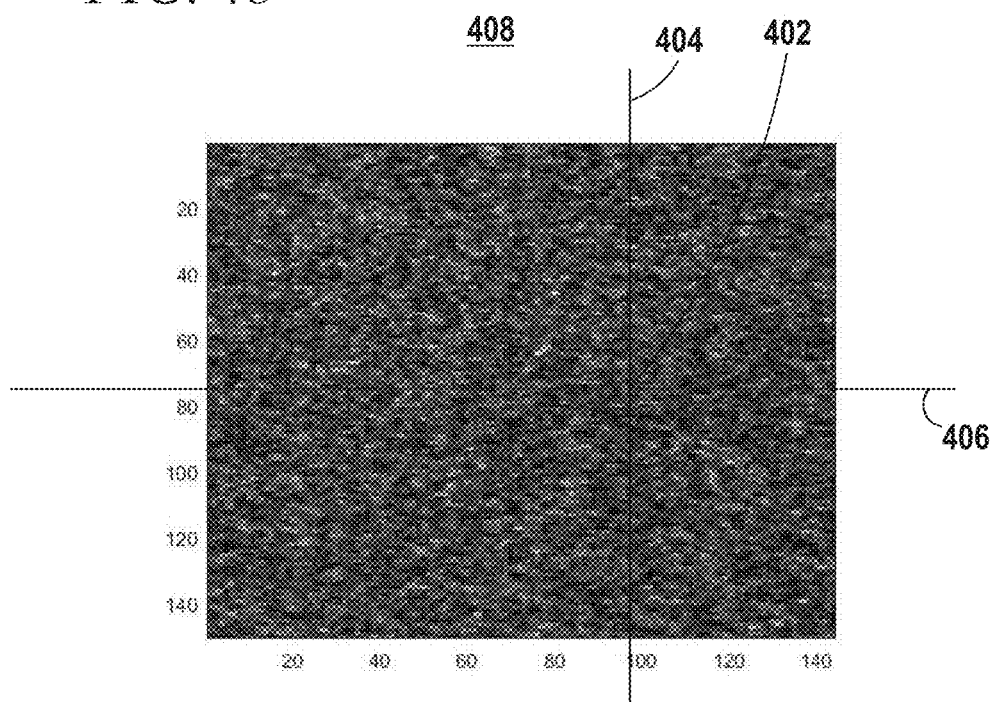
Figure 4C:
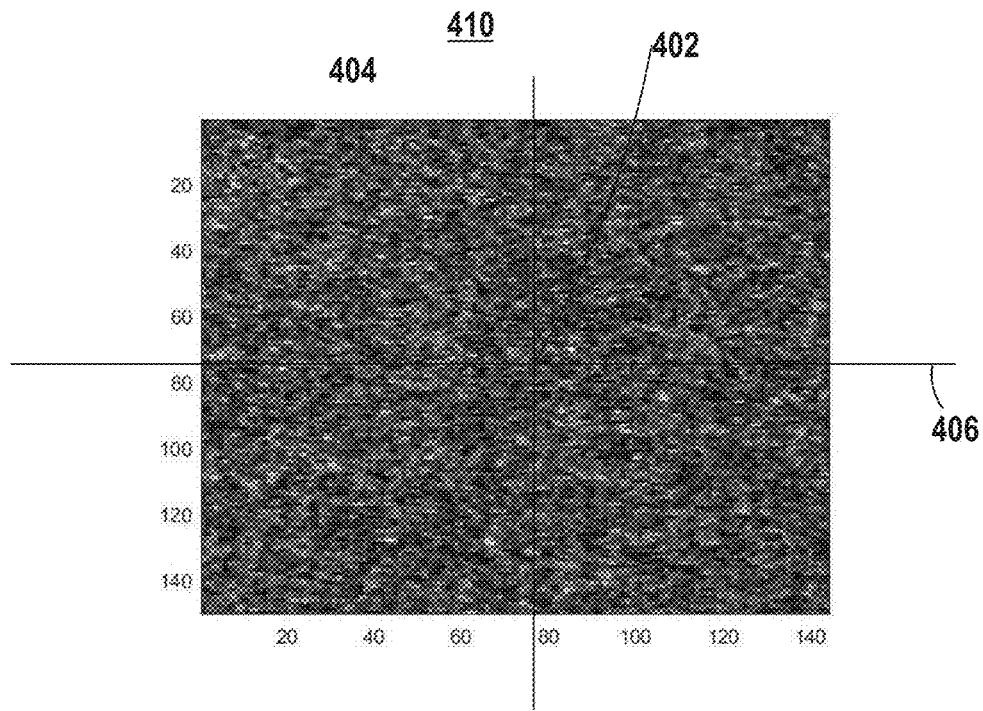
Figure 4D:
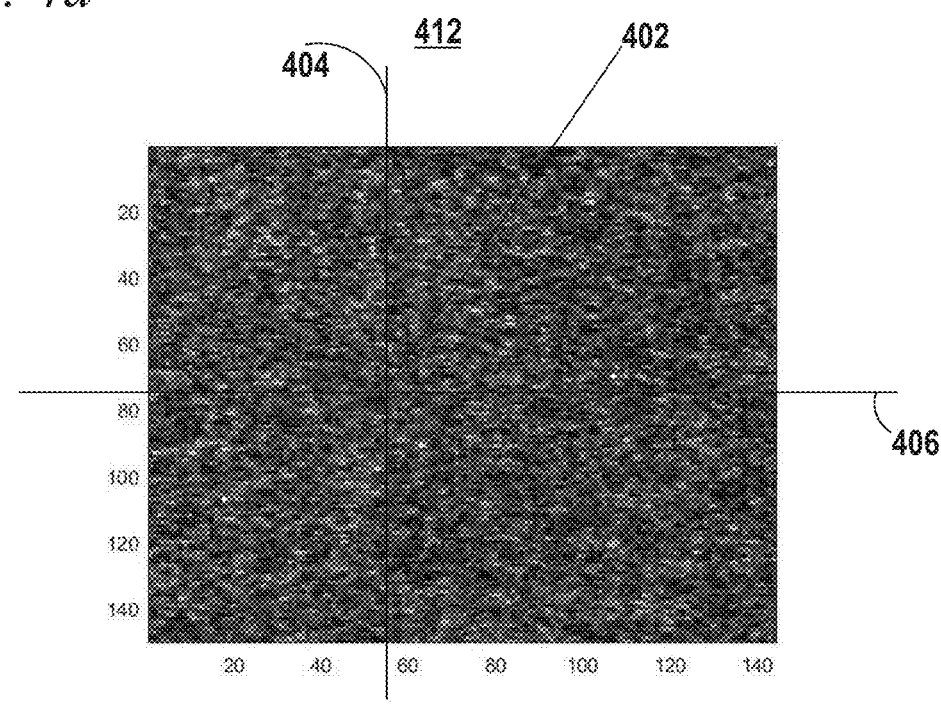
Figure 4E:
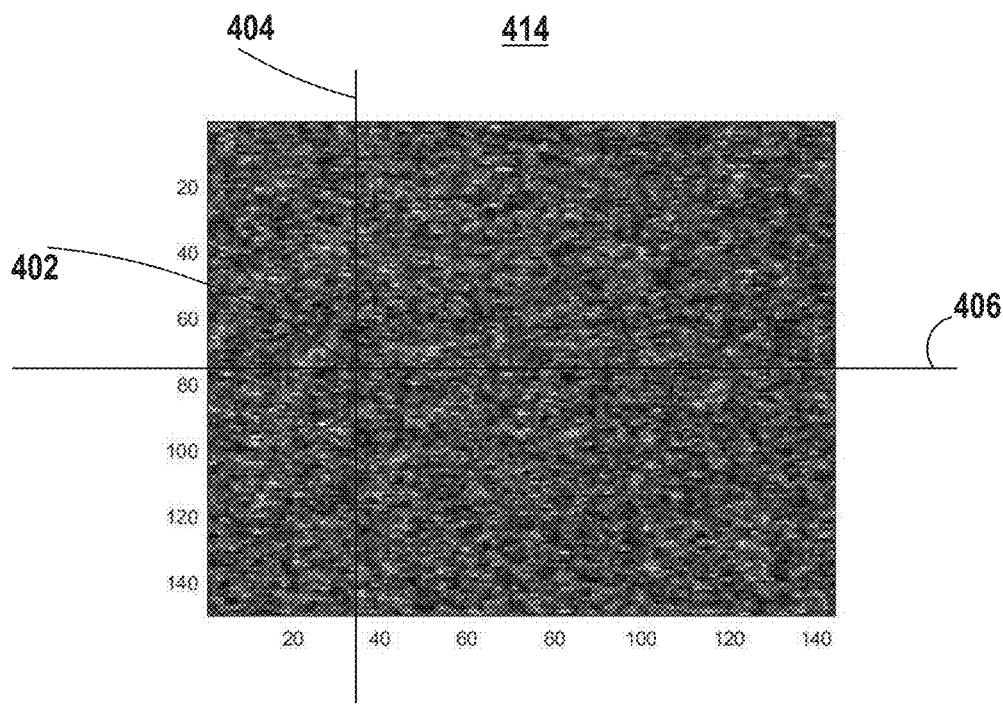
Figure 4F:
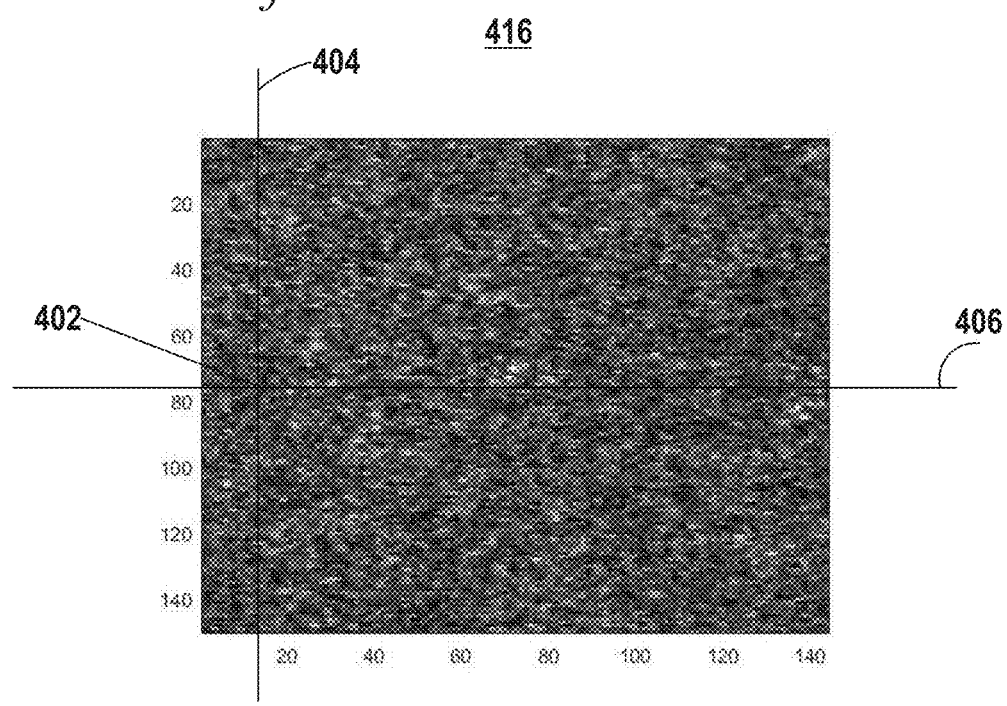

FIG. 4a is an initial image of a speckle pattern 400 that can be used to track motion in the system shown in FIGS. 1-3. FIGS. 4b-4f show a sequence of images 408, 410, 412, 414, 416 of the speckle pattern 400 shown in FIG. 4a after a sequence of translation increments. An initial arbitrary position 402 in the speckle pattern 400 is marked with a vertical line 404 and a horizontal line 406. An optical flow tracking method, such as, but not limited to those mentioned above can be used to track the movement of the speckle pattern. The translation distance of the speckle pattern is equal to twice the physical translation augmented reality headgear 104 which includes the motion detection system 200. The location of the arbitrarily selected position 402 is shown in each of the successive FIGS. 4b-4f.

Figure 5:
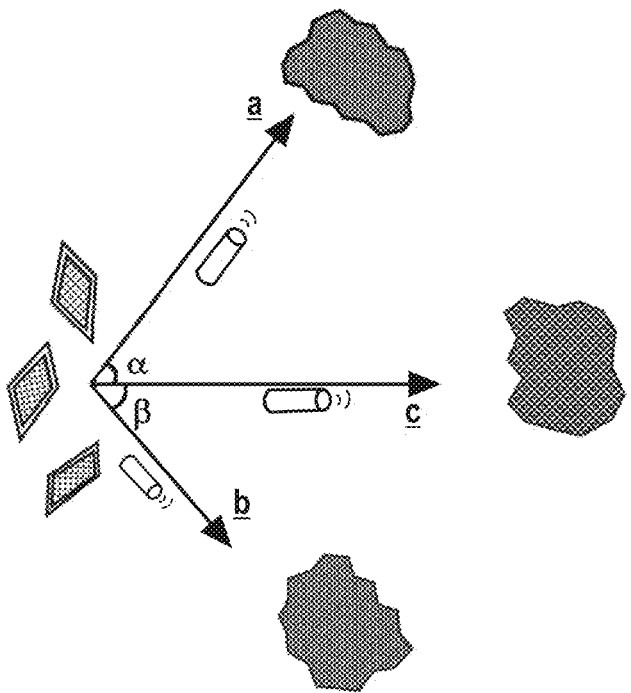
FIG. 5 is a schematic diagram of a motion detection system included in augmented reality headgear according to an alternative embodiment.

FIG. 5 is a schematic diagram of a motion detection system 500 included in augmented reality headgear 104 according to an alternative embodiment. The system 300 includes a first laser 506 oriented to point in a first direction, a second laser 508 oriented to point in a second direction, and a third laser oriented to point in third direction. The system 300 also includes a first 2D optical sensor array facing in the first direction, a second 2D optical sensor array facing in the second direction and a third 2D optical sensor array facing in the third direction. Whereas, in the case of the motion detection system 300 shown in FIG. 3 the lasers 116, 118, 120 point in a set of three orthogonal directions and the 2D optical sensor arrays 122, 124, 126 are oriented to face in the same set of three orthogonal directions, in the case of the motion detection system 500 shown in FIG. 5, the first, second and third directions are not orthogonal.

FIG. 6 is a perspective view of an augmented reality headgear 600 with an eyeglasses form factor according to another embodiment and FIG. 7 is a schematic representation of a motion detection system 700 that is included in the augmented reality headgear 600. The augmented reality headgear 600 includes a frame 602 supporting a left (user's left) transparent eyepiece 604 and a right transparent eyepiece 606. The left transparent eyepiece 604 includes a left ICG 604A, a left OPE 604B and a left EPE 604C and similarly the right transparent eyepiece 606 includes a right ICG 606A, a right OPE 606B and a right EPE 606C. Each of the eyepieces 604, 606 can alternatively include multiple waveguides to handle multiple color channels and or to output imagery at different wavefront curvatures (corresponding to different virtual image distances). A left source of imagewise modulated light 608 is optically coupled to the left transparent eyepiece 604 and right source of imagewise modulated light 610 is optically coupled to the right transparent eyepiece 606. The transparent eyepieces 604, 606 serve to optically couple imagewise modulated light to a user's eyes.

The augmented reality headgear 600 is further equipped with a right laser 611, a left laser 612, a left 2D optical sensor array 614 and a right 2D optical sensor array 616. The forward direction corresponds to the +X axis of the Cartesian coordinate system triad shown in FIG. 6. The left laser 612 and the left 2D optical sensor array 614 face in a direction that is tilted to the left azimuthally (rotated about the vertically oriented Z axis) with respect to the forward direction and right laser 611 and the right 2D optical sensor array 616 face in a direction that is tilted to the right azimuthally with respect to the forward direction. The direction in which the left laser 612 and left optical sensor 614 face is defined by a left normal vector $N_L$ that is normal to a light receiving surface of the left optical sensor 614 and the direction in which the right laser 611 and the right optical sensor 616 face is defined by a right normal vector $N_R$ that is normal to a light receiving surface of the right optical sensor 616. Alternatively there can be a difference between the direction in which each laser and associated sensor face. A difference vector D between the left normal vector $N_L$ and the right normal vector $N_R$ is shown in FIG. 7. The left 2D optical sensor array 614 and the right 2D optical sensor array 616 have separate fields of view. The field of view of the left 2D optical sensor array 614 includes, at least, a substantial portion of the range of emission of the left laser 612 and the field of view of the right 2D optical sensor array 616 includes, at least, a substantial portion of the solid angle range of emission of the right laser 611. The fields of view of the left and right 2D optical sensor arrays 614, 616 could be limited by pupil stops or other field of view limiting optical components (not shown in FIG. 6). For example, the field of view of the left 2D optical sensor array 614 could be limit to exclude the angular range of emission right laser 611 and vice versa.

Optionally the left 2D optical sensor array 614 can be equipped with a left imaging lens 618 and the right 2D optical sensor array 616 can be equipped with a right imaging lens 620. The imaging lenses 618, 620 focus and magnify or demagnify speckle light from, respectively a left focal plane 622 and a right focal plane 624 that are positioned in space in front of the imaging lenses 618, 620 onto the 2D optical sensor arrays 614, 616.

It should be noted that the Y axis of the Cartesian coordinate triad extends sideways from left to right. The motion detection system 700 incorporated in the augmented reality headgear 600 is capable of sensing and discriminating 4 degrees of freedom, including translation components along the X-axis, Y-axis and Z-axis and rotation about the forward facing X-axis. The left normal vector $N_L$ and the right normal vector $N_R$ define a virtual plane, and on the plane defined by $N_L$ and $N_R$ there is an angular range between $N_L$ and $N_R$. A translation component having a projection on the plane defined by $N_L$ and $N_R$ in the angular range between $N_L$ and $N_R$ can be sensed by sensing opposite direction speckle pattern shifts on the left and right 2D optical sensor arrays 614, 616 that are parallel to the plane defined by $N_L$ and $N_R$. In the preceding case a first optical flow on the left 2D optical sensor array 614 and a second optical flow on the right 2D optical sensor array 616 have opposite direction projections on the difference vector D.

On the other hand, a translation component having a projection on the plane defined by $N_L$ and $N_R$ outside the angular range between $N_L$ and $N_R$ can be sensed by sensing same direction speckle pattern shifts on the left and right 2D optical sensor arrays 614, 616 that are parallel to the plane defined by $N_L$ and $N_R$. In the latter case a first optical flow on the left 2D optical sensor array 614 and a second optical flow on the right 2D optical sensor array 616 have common direction projections on the difference vector D. Furthermore a translation component perpendicular to the plane defined by $N_L$ and $N_R$ can be sensed by sensing same direction speckle pattern shifts on the left and right 2D optical sensor arrays 614, 616 that are perpendicular to the plane defined by $N_L$ and $N_R$. Additionally rotations about the forward extending +X axis can be sensed by sensing opposite vertical direction speckle pattern shifts on the left and right 2D optical sensor arrays 614, 616 that are perpendicular to the plane defined by $N_L$ and $N_R$.

Figure 8:
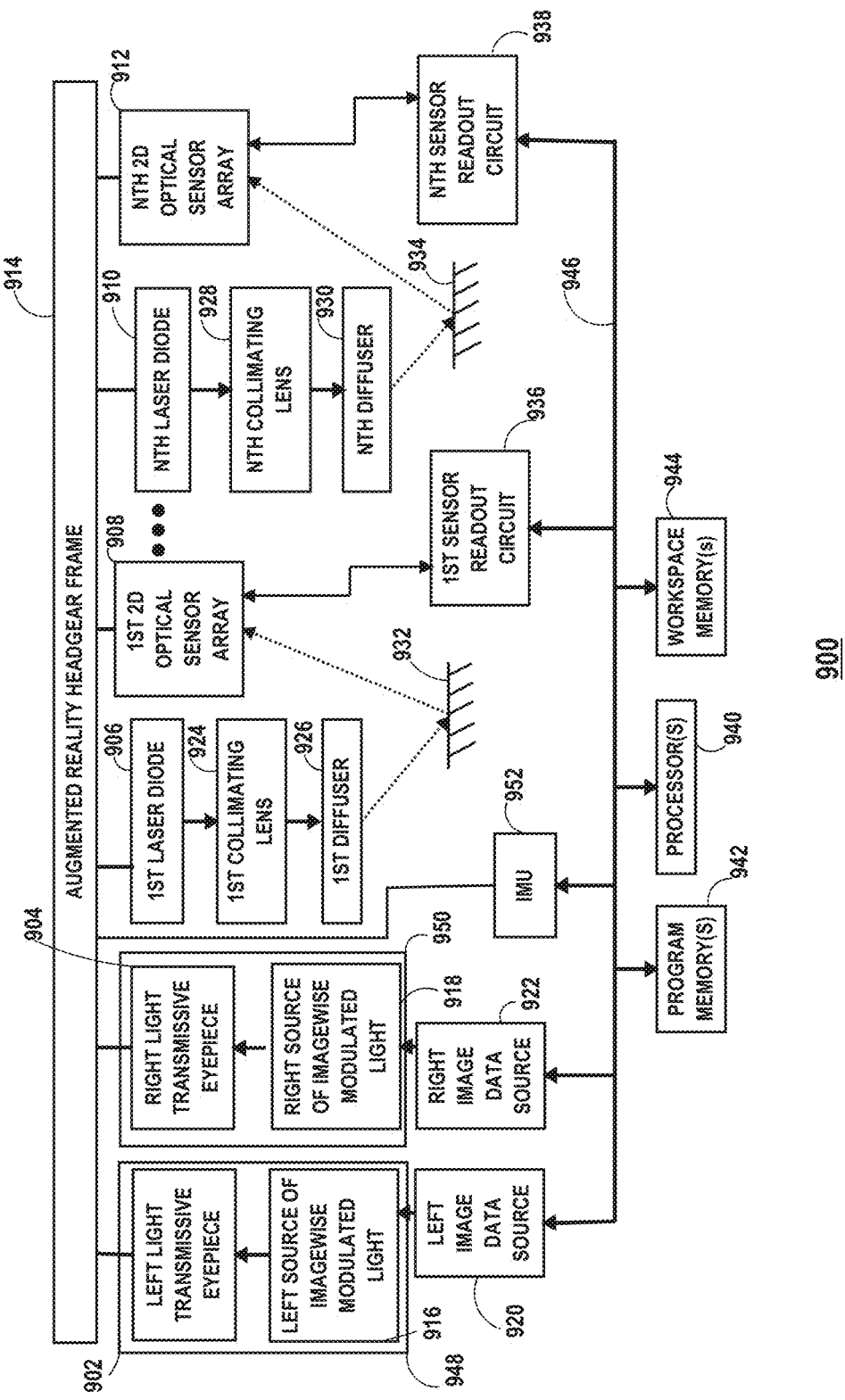
FIG. 8 is a block diagram of an augmented reality headgear which is applicable to the augmented reality headgear shown FIG. 1 and FIG. 6 according to an embodiment.

FIG. 8 is a block diagram of augmented reality headgear 900 according to an embodiment. The design shown in FIG. 8 can be used for the augmented reality headgear shown in FIG. 1 and FIG. 6 according to certain embodiments. The augmented reality headgear 900 includes a left light transmissive (see-through) eyepiece 902, a right light transmissive eyepiece 904, a first laser diode 906, a first 2D optical sensor array 908, an $N^{TH}$ laser diode 910 and an $N^{TH}$ 2D optical sensor array 912 all mechanically coupled to an augmented reality headgear frame 914. It should be understood that the use of the identifier "$N^{TH}$" signifies that the number of like components including the one identified by as the "$N^{TH}$" is variable. For example in the case of the augmented reality headgear 104 shown in FIG. 1 three laser diodes are utilized within the three lasers 116, 118, 120, whereas in the case of the augmented reality headgear 600 shown in FIG. 6 a single laser diode (not shown in FIG. 6) is provided within the forward directed laser 612.

A left source of imagewise modulated light 916 is optically coupled to the left light transmissive eyepiece 902 and a right source of imagewise modulated light 918 is optically coupled to the right light transmissive eyepiece 904. The sources of imagewise modulated light 916, 918 can for example comprise fiber scanners, LCoS projectors or MEMS light beam scanners, or micro emissive displays. A left image data source 920 is coupled to the left source of imagewise modulated light 916 and a right image data source 922 is coupled to right source of imagewise modulated light 918. The image data sources 920, 922 can, for example, take the form of display drivers. The left source of imagewise modulated light 916 in combination with the left light transmissive eyepiece 902 forms a left display 948 and the right source of imagewise modulated light 918 in combination with the right light transmissive eyepiece 904 forms a right display 950. The left and right sources of imagewise modulated light 916, 918 modulate light in accordance with data provided by, respectively, the left and right image data sources 920, 922. The left and right image data sources 920, 922 can take the form of frame buffers supplied with data by a graphics processing unit (GPU) that along with a microprocessor runs a game engine program.

The first laser diode 906 is optically coupled through a first collimating lens 924 to a first diffuser 926 and the $N^{TH}$ laser diode 912 is optically coupled through an $N^{TH}$ collimating lens 928 to an $N^{TH}$ diffuser 930. Coherent light from the first laser diode 906 that is coupled through the first collimating lens 924 and the first diffuser 926 is incident on a first surface patch 932 (e.g., wall, ceiling, floor, furniture) in an environment of the augmented reality headgear 900 which forms a first speckle pattern (diffraction pattern of small scale roughness of surface) which is incident on the first 2D optical sensor array 908. Similarly, coherent light from the $N^{TH}$ laser diode 910 that is coupled though the $N^{TH}$ collimating lens 928 and the $N^{TH}$ diffuser 930 is incident on an $N^{TH}$ surface patch 934 in the environment of the augmented reality headgear 900 forming an $N^{TH}$ speckle pattern which is incident on the $N^{TH}$ 2D optical sensor array 912.

A first sensor readout circuit 936 is coupled to the first 2D optical sensor array 908 and an $N^{TH}$ sensor readout circuit 938 is coupled to the $N^{TH}$ 2D optical sensor array 912. An inertial measurement unit (IMU) 952 is mechanically coupled to the frame 914. The first sensor readout circuit 936, the $N^{TH}$ sensor readout circuit 938, the left image data source 920, the firth image data source 922, the IMU 952, at least one processor 940, at least one program memory 942 and at least one workspace memory 944 are coupled together via at least one bus 946. The at least one processor 940 can for example include a microprocessor, a graphics processing unit, a digital signal processor and/or a microcontroller. The IMU 952 can be used in conjunction with the components described above which detect motion via speckle optical flow. For example the IMU 952 can be used as an additional redundant source of motion information to improve accuracy or information from the IMU can be combined with information obtained via speckle flow monitoring to fully determine the 6DoF of the headgear 900.

Figure 9:
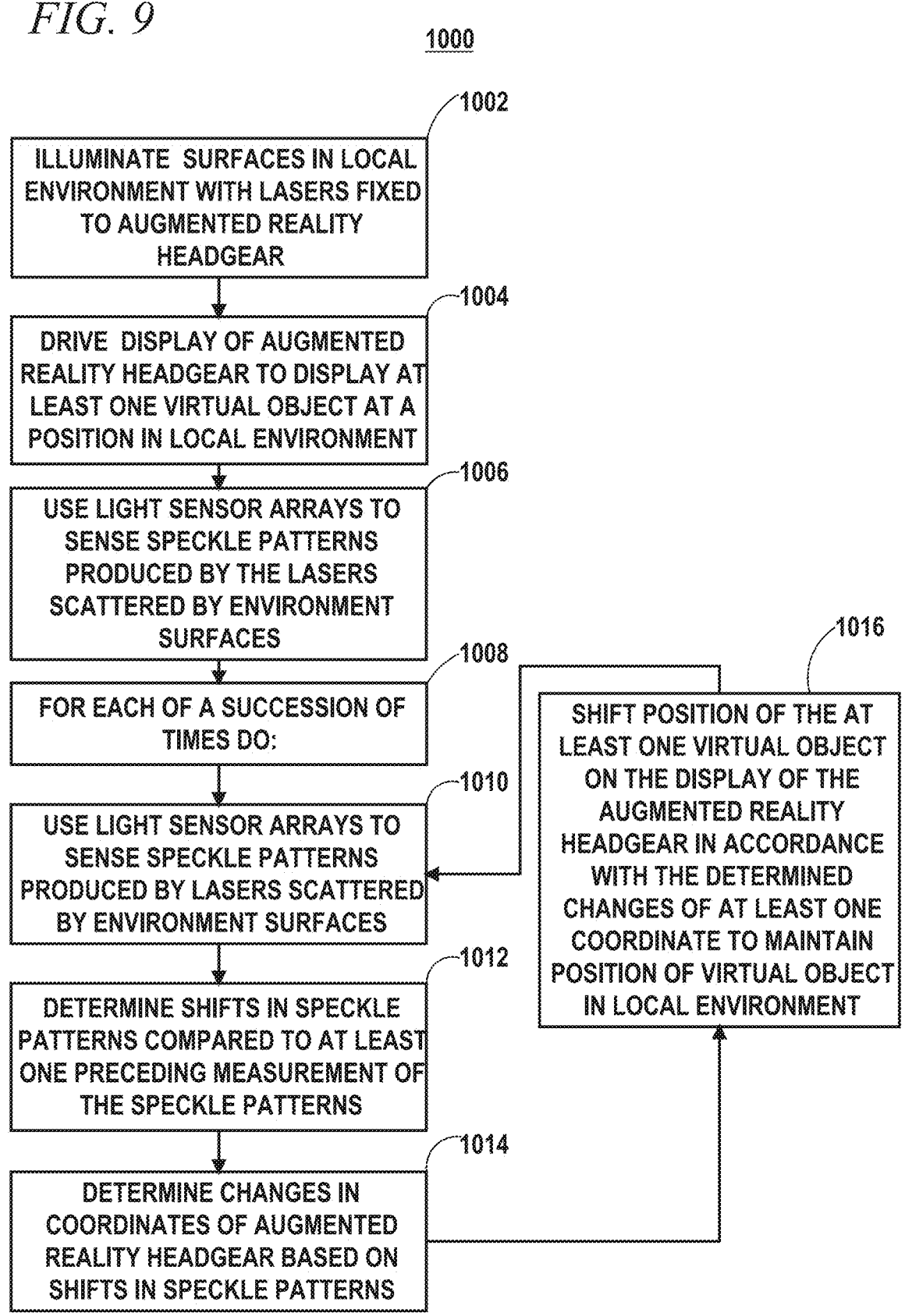
FIG. 9 is flowchart of a method of operating the augmented reality headgear shown in FIG. 1 according to an embodiment.

FIG. 9 is flowchart of a method 1000 of operating the augmented reality headgear 104 shown in FIG. 1 according to an embodiment. The augmented reality headgear 600, 900 shown in FIGS. 6, 8 can be operated in an analogous manner. In block 1002 surfaces (e.g., 204, 206, 208) in a local environment of the headgear 104 are illuminated with at lasers 116, 118, 120 fixed to the augmented reality headgear 104. In block 1004 the displays of the augmented reality headgear is operated to display at least one virtual object at a position (defined by a set of coordinates) in the local environment. The eyepieces 108, 110 in combination with the sources of imagewise modulated light 112, 114 together form displays. FIG. 10 is a schematic illustration of an example of the use of the augmented reality 104 headgear shown in FIG. 1 being used according to the method shown in FIG. 10. In FIG. 10 the headgear 1100 is shown on the user's head 102. The user is viewing a virtual object 1102 in the form of a book which is displayed using the displays of the augmented reality headgear. The virtual object 1102 located on a real table 1104. Other examples of virtual content can include, for example, people, animals, imaginary creatures, and/or moving objects. In the case of moving virtual content, the movement of the virtual content is defined in an inertial reference frame fixed to the physical environment and the motion of the head gear is tracked so that it can be compensated for (nulled out) so that the movement of the head gear does add velocity to the intended movement of the virtual content relative to the physical environment. Referring again to FIG. 9 in block 1006 the light sensor arrays 122, 124, 126 are used to sense speckle patterns produced by the lasers 116, 118, 120 being scattered by the environment surfaces (e.g., 204, 206, 208). In executing block 1006 and block 1010 described below, the speckle patterns may, for example, be received from the sensor readout circuits 936, 938 (FIG. 8) in the workspace memory 944 (FIG. 8) under the control of the at least one processor 940 (FIG. 8). Block 1008 marks the start of a loop that is executed for each of a succession of times. In block 1010 the light sensor arrays are again used to sense the speckle patterns produced by the lasers 116, 118, 120 being scattered by the environment surfaces (e.g., 204, 206, 208). In block 1012 the shifts in each particular speckle pattern compared to at least one preceding measurement of the particular speckle patterns are determined. An optical flow determination method such as discussed above may be used in executing block 1012. In block 1014 changes in the translation and rotation coordinates of the augmented reality head gear are determined based on the shifts in the speckle patterns determine in block 1012. In executing block 1014 EQU. 2 described above can be used. Next in block 1016 the position (coordinates) of the virtual object on the display of the augmented reality headgear 104 is shifted in accordance with the change of at least one coordinate, as determined in block 1014, in order to maintain the positon of the virtual object in the local environment, for example to maintain the virtual book 1102 in position on the real table 1104. The position of the virtual object is shifted by adjusting the imagewise modulated light that is coupled to the user's eyes through the eyepieces. The method 1100 can be executed under the control of a program that is stored in the at least one memory 942 and executed by the at least one processor 940 using the at least one workspace memory 944. More generally speaking, the head gear 100, 600, 900 is provide with some form of electronic circuitry, which may alternatively include, by way of nonlimitive example, an Application Specific Integrated Circuit (ASIC) and/or FPGA that determines the speckle shifts between successive times and based on the speckle shifts determines incremental motions (translations and rotations) between successive times, and adjust the position of displayed virtual objects to compensate for the incremental motions.

While embodiments described above include augmented reality glasses that include transparent eyepieces through which the user may view the real world while also viewing virtual content, alternatively the 6DoF tracking systems described above may be incorporated in virtual reality goggles in which the user's view of the real world is occluded and the user may only see virtual content. The 6DoF systems described above may also be applied to a type of augmented reality in which the user cannot directly view the real world but can view imagery of the real world captured by one or more cameras and displayed to the user along with virtual content.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method of detecting motion of augmented reality (AR) headgear, the method comprising:
projecting light from a first coherent light source onto a first surface;
projecting light from a second coherent light source onto a second surface;
receiving light reflected from the first surface to form a first speckle pattern on a first optical sensor characterized by a first surface normal oriented in a first direction;
receiving light reflected from the second surface to form a second speckle pattern on a second optical sensor characterized by a second surface normal oriented in a second direction, wherein the second direction is different from the first direction and a third direction is orthogonal to the first direction and the second direction;
sensing, using the first optical sensor, translation of the first speckle pattern in a direction azimuthal with respect to the third direction;
sensing, using the second optical sensor, translation of the second speckle pattern in at least one of the direction azimuthal with respect to the third direction or another direction azimuthal with respect to the third direction; and
sensing rotation of the headgear about the third direction based on the translation of the first speckle pattern and the translation of the second speckle pattern.

2. The method of claim 1 further comprising:
sensing, using the first optical sensor, translation of the first speckle pattern in the third direction;
sensing, using the second optical sensor, translation of the second speckle pattern in the third direction; and
sensing translation of the headgear in the third direction based on the translation of the first speckle pattern and the translation of the second speckle pattern in the third direction.

3. The method of claim 1 further comprising:
sensing, using the first optical sensor, translation of the first speckle pattern in the third direction;
sensing, using the second optical sensor, translation of the second speckle pattern in the third direction; and sensing rotation of the headgear based on the translation of the first speckle pattern and the translation of the second speckle pattern.

4. The method of claim 1 further comprising:
projecting light from a third coherent light source onto a third surface;
receiving light reflected from the third surface to form a third speckle pattern on a third optical sensor characterized by surface normal oriented in the third direction;
sensing, using the first optical sensor, translation of the first speckle pattern in a direction azimuthal with respect to the second direction;
sensing, using the third optical sensor, translation of the third speckle pattern in at least one of the direction azimuthal to the second direction or another direction azimuthal with respect to the second direction; and
sensing rotation of the AR headgear about the second direction based on the translation of the first speckle pattern and the translation of the third speckle pattern.

5. The method of claim 4 further comprising:
sensing, using the first optical sensor, translation of the first speckle pattern in the second direction;
sensing, using the third optical sensor, translation of the third speckle pattern in the second direction; and
sensing translation of the headgear in the second direction based on the translation of the first speckle pattern and the translation of the third speckle pattern.

6. The method of claim 4 further comprising:
sensing, using the first optical sensor, translation of the first speckle pattern in the second direction;
sensing, using the third optical sensor, translation of the third speckle pattern in the second direction; and
sensing rotation of the headgear based on the translation of the first speckle pattern and the translation of the second speckle pattern.

7. The method of claim 4 further comprising:
sensing, using the second optical sensor, translation of the second speckle pattern in a direction azimuthal with respect to the first direction;
sensing, using the third optical sensor, translation of the third speckle pattern in the direction azimuthal with respect to the first direction or another direction azimuthal with respect to the first direction; and
sensing rotation of the AR headgear about the first direction based on the translation of the second speckle pattern and the translation of the third speckle pattern.

8. The method of claim 4 further comprising:
sensing, using the second optical sensor, translation of the second speckle pattern in the first direction;
sensing, using the third optical sensor, translation of the third speckle pattern in the first direction; and
sensing translation of the headgear in the first direction based on the translation of the second speckle pattern and the translation of the third speckle pattern.

9. The method of claim 4 wherein the headgear further comprises an aperture stop disposed in front of the third optical sensor and operable to prevent the light reflected from the first surface and the light reflected from the second surface from reaching the third optical sensor.

10. The method of claim 1 wherein the headgear further comprises an aperture stop disposed in front of the first optical sensor and operable to prevent light reflected from the second surface from reaching the first optical sensor.

11. The method of claim 1 wherein the headgear further comprises an aperture stop disposed in front of the second optical sensor and operable to prevent light reflected from the first surface from reaching the second optical sensor.

12. An augmented reality (AR) headgear comprising:
a first optical sensor having a first surface normal pointed in a first direction and operable to receive light reflected from a first surface, wherein the first optical sensor is characterized by a first field of view;
a second optical sensor having a second surface normal pointed in a second direction and operable to receive light reflected from a second surface, wherein the second optical sensor is characterized by a second field of view;
a set of coherent light sources operable to project light onto the first surface and the second surface; and
electronic circuitry configured to:
sense translation of a first speckle pattern formed on the first optical sensor by light reflected from the first surface, wherein the translation of the first speckle pattern is along at least one of the second direction or a direction azimuthal to the first direction; and
sense translation of a second speckle pattern formed on the second optical sensor by light reflected from the second surface, wherein the translation of the second speckle pattern is along at least one of the first direction or a direction azimuthal to the second direction.

13. The AR headgear of claim 12 wherein the first optical sensor comprises a 2D optical sensor array.

14. The AR headgear of claim 12 wherein the second optical sensor comprises a 2D optical sensor array.

15. The AR headgear of claim 12 further comprising an aperture stop disposed in front of the first optical sensor and operable to prevent the light reflected from the second surface from reaching the first optical sensor.

16. The AR headgear of claim 12 further comprising an aperture stop disposed in front of the second optical sensor and operable to prevent light reflected from the first surface from reaching the second optical sensor.

17. The AR headgear of claim 12 further comprising:
at least one source of imagewise modulated light configured to provide imagewise modulated light; and
at least one transparent eyepiece configured to couple the imagewise modulated light into a user's eye while allowing a user to see a real world.

18. The AR headgear of claim 17 wherein the electronic circuitry is further configured to operate the at least one source of imagewise modulated light to display a virtual object at a set of coordinates defined in an inertial reference frame fixed to a physical space occupied by a user wearing the AR headgear.

19. The AR headgear of claim 12 wherein the electronic circuitry is further configured to sense rotation about a third direction orthogonal to the first direction and the second direction based on the translation of the first speckle pattern along the second direction and the translation of the second speckle pattern along the first direction.

20. The AR headgear of claim 12 wherein the electronic circuitry is further configured to sense translation along a third direction orthogonal to the first direction and the second direction based on the translation of the first speckle pattern along the direction azimuthal to the first direction and the translation of the second speckle pattern along the direction azimuthal to the second direction.

* * * * *